Nov. 10, 1964 A. HUET 3,156,626
NUCLEAR REACTOR SUPPLYING SUPERHEATED STEAM
Filed March 12, 1962

United States Patent Office 3,156,626
Patented Nov. 10, 1964

3,156,626
NUCLEAR REACTOR SUPPLYING SUPER-
HEATED STEAM
André Huet, 48 Ave. du Président Wilson, Paris, France
Filed Mar. 12, 1962, Ser. No. 178,965
Claims priority, application France, Mar. 22, 1961,
856,382, Patent 1,292,317
7 Claims. (Cl. 176—54)

It is known that there are nuclear reactors in which the fuel rods are immersed in a liquid such as ordinary water or heavy water, which is brought to boiling and vaporizes to absorb the heat released by the pile.

I have already proposed the arrangement, in reactors of this type, of liquid and steam separators consisting of a helical apparatus placed between the fuel rods, the sides of which are preferably of curvilinear quadrilateral shape, in such a way that the liquid used in the reactor is subjected to a centrifugal action which ensures the separation of water and steam while at the same time improving the cooling of the surfaces of the fuel components.

The aim of the present invention is a boiling liquid nuclear reactor, having an apparatus for the separation of liquid and steam which can be of the type described above, and also having an arrangement, being the object of the invention, according to which the steam separated inside the reactor is superheated, before leaving the reactor, by passing over additional fuel rods.

In the embodiment of the invention which will be described, the superheated steam forms in the zone surrounding the axis of the water and steam separating apparatus, the axial tube provided in the apparatus receiving the additional fuel rods which ensure the superheating of the steam.

The description which follows, referring to the drawings given by way of example, will explain how the invention can be practiced.

Figure 2:
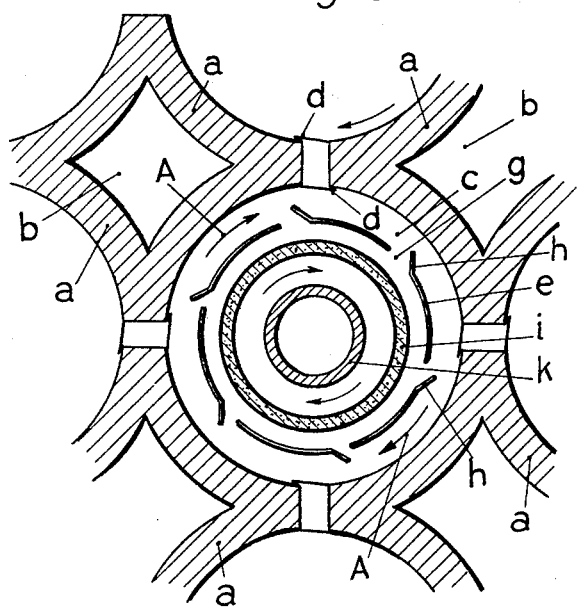
FIG. 2 is a horizontal section of the component in FIG 1.

The nuclear reactor which is the object of the invention is composed of fuel rods distributed in the usual manner, four of which, such as $a$ have been shown in FIG. 2 (the upper left-hand rod in its entirety).

Figure 1:
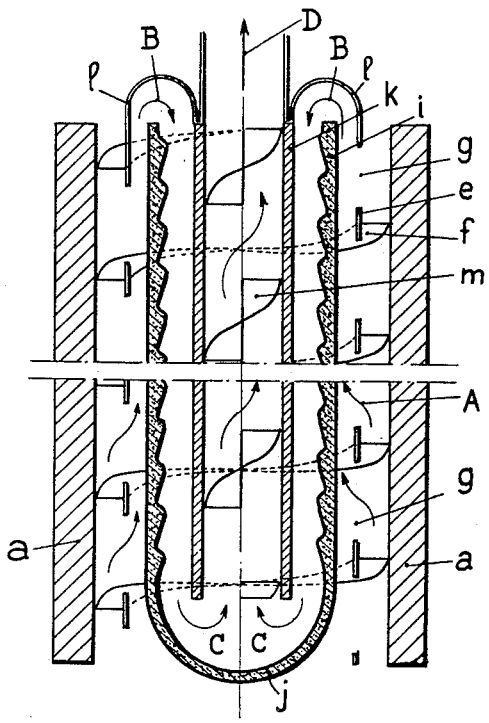
FIG. 1 shows a vertical section of a water and steam separating component and steam superheater according to the invention, situated between four fuel rods.

As can be seen from this figure, the cross-section of the rods is square-shaped with curvilinear sides. These rods can be hollow, as indicated at $b$, so that the average thickness of the rod is fairly constant. Four sections of rod such as shown at $a$ enclose a cylindrical space $c$ of circular cross-section in which is arranged a water and steam separator. Laminae are disposed at the points of junction of the fuel rods $a$, such as indicated at $d$, which can be permeated by neutrons, the effect being to close the gap remaining between the two walls of the rod sections $a$. In this way the fuel rods $a$ can be moved symmetrically towards or away from each other to a slight extent without the space $c$ ceasing to be cylindrical and developing slits or openings. Inside each space $c$ of circular cross-section is provided a tube $e$ and between the tube $e$ and the wall of the space $c$ is arrange a helical ramp $f$ (FIG. 1). Lateral slits $g$ are provided over the entire height of the tube $e$ between the spirals of the ramp $f$, as can be seen in FIGS. 1 and 2.

The mixture of water and steam rises in the gap $c$ enclosed between the tube $e$ and the uranium rods, on the helical ramps $f$, in the direction of the arrows A (FIGS. 1 and 2). Centrifugal force flings the water outwards while the steam, which is lighter, gravitates towards the axis of the apparatus, passing through the slits $g$, the louvres $h$ of which are, for example, turned in the direction opposite to that of the rotation of the fluid (FIG. 2) in order to catch the steam which has formed and to facilitate is passage into the axis of the apparatus.

According to the invention, in the axis of this helical water and steam separator, is arranged a heat-insulated tube $i$, the bottom of which is closed by a hemi-spherical cap $j$ (FIG. 1). The cylindrical wall $i$ thus constituted is partially pervious to neutrons and may have a moderating action by the addition of graphite for example. Inside this wall $i$ is arranged a tube of uranium or other combustible material $k$.

Because of this construction, the steam which has passed through the slits $g$ of the first cylinder $e$ rises in the gap enclosed between cylinder $e$ and the tube $i$. At the top, it is deflected in the direction of the arrows B (FIG. 1) by a cap $l$ in the shape of a semi-torus, which closes the annular space included between the sleeve $e$ and the uranium rod $k$, and the steam then passes downwards again between the uranium rod $k$ and the heat-insulated wall $i$. The inside wall of the insulation $i$ can preferably be corrugated, for example in an asymmetrical manner, in order to ensure jarring of the steam as it flows. The steam thus reaches the base of the uranium rod $k$ and flows in the direction of the arrows C (FIG. 1) inside this rod, in which a helical apparatus $m$ can be provided to give the steam a gyratory movement inside the fuel rod and thereby ensure superheating of the steam, which emerges completely dry and superheated in the direction of the arrow D at the top of the apparatus.

Figure 3:
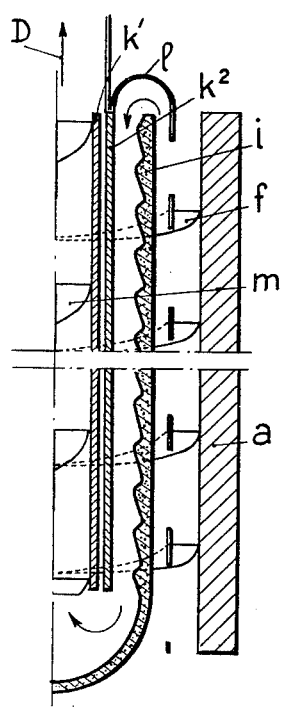
FIG. 3 is a vertical half section showing a variation of the embodiment of FIGS. 1 and 2.

In the variation shown in FIG. 3, the arrangement is basically the same. However, the inside uranium rod $k$ is subdivided into two or more co-axial tubular rods $k^1$, $k^2$ that can have different properties: the outer rod $k^2$ for example will be of natural or almost natural uranium, whereas the inner rod $k^1$ will be of enriched uranium. In this way the temperature released along the rod $k^1$ is higher than that released by the rod $k^2$, and the steam superheated along the rod $k^1$ emerges at its maximum temperature. A slight gap may remain between the rods $k^1$, $k^2$ as shown in FIG. 3, so as to allow for the dilatations due to the differences in temperature. The steam which would pass into this gap is released at the top.

It is understood that the details could be modified without departing from the basic concept of the invention.

I claim:

1. In a boiling liquid nuclear reactor, a plurality of fuel rods disposed in circumferentially-adjoining relationship to enclosed between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods.

2. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods, said steam-guiding means comprising a cylindrical tube of heat-insulating material and pervious to neutrons disposed inside said cylindrical space between said plurality of fuel rods and said additional fuel rod, said tube being closed at the bottom and positioned to receive the separated steam at its top to guide it over said exterior and interior surfaces of said additional fuel rod.

3. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods, said steam-guiding means comprising a cylindrical tube of heat-insulating material and pervious to neutrons disposed inside said cylindrical space between said plurality of fuel rods and said additional fuel rod, said tube being closed at the bottom and positioned to receive the separated steam at its top to guide it over said exterior and interior surfaces of said additional fuel rod, said heat-insulating tube having a moderating substance incorporated therein and having asymmetrical corrugations on its inner wall.

4. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods, the joints between adjacent fuel rods of said plurality of fuel rods being covered by laminae, each lamina being secured to one of the fuel rods at each joint and slidably overlying the adjacent fuel rod.

5. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods, said steam-guiding means comprising a cylindrical tube of heat-insulating material and pervious to neutrons disposed inside said cylindrical space between said plurality of fuel rods and said additional fuel rod, said tube being closed at the bottom and positioned to receive the separated steam at its top to guide it over said exterior and interior surfaces of said additional fuel rod, and helical steam-guiding means disposed inside said additional fuel rod.

6. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, a cylindrical tube of heat-insulating material pervious to neutrons disposed inside said cylindrical space, said tube being closed at its bottom and positioned to receive the separated steam at its top, two tubular coaxial fuel rods disposed inside the heat-insulated cylindrical tube and spaced from its inner wall, the outer tubular fuel rod being of natural uranium and the inner tubular fuel rod being of enriched uranium, means for causing the steam to flow downwardly through the space between the outer tubular fuel rod and the heat-insulating cylinder, and upwardly inside the inner tubular fuel rod before to be in an axial direction towards the top of the reactor.

7. In a boiling liquid nuclear reactor, a plurality of fuel rods disposed in circumferentially-adjoining relationship to enclose between them a cylindrical space, said space being adapted to have boiling liquid flow upwardly therethrough, means in said space for separating steam from the boiling liquid inside said cylindrical space, and at least one additional fuel rod disposed inside said cylindrical space to superheat the steam which is released towards the top of said space, said additional fuel rod being hollow, and means for guiding said steam first over the exterior surface and then over the interior surface of said additional fuel rod, whereby said steam can be superheated under controlled conditions which are not influenced by the conditions under which the steam is initially generated by said first-named plurality of fuel rods, said steam-guiding means comprising a cylindrical tube of heat-insulating material and pervious to neutrons disposed inside said cylindrical space between said plurality of fuel rods and said additional fuel rod, said tube being closed at the bottom and positioned to receive the separated steam at its top to guide it over said exterior and interior surfaces of said additional fuel rod, means for separating steam comprising means in the form of a helix disposed in the annular space between the cylinder and the adjacent walls of the plurality of fuel rods.

References Cited in the file of this patent

UNITED STATES PATENTS

| | | |
|---|---|---|
| 2,938,845 | Treshow | May 31, 1960 |
| 3,034,977 | Hall et al. | May 15, 1962 |
| 3,063,925 | Huet | Nov. 13, 1962 |

FOREIGN PATENTS

| | | |
|---|---|---|
| 553,050 | Belgium | Dec. 15, 1956 |
| 1,141,064 | France | Mar. 11, 1957 |
| 1,051,425 | Germany | Feb. 26, 1959 |
| 1,198,728 | France | June 15, 1959 |
| 204,142 | Australia | June 25, 1959 |